(12) United States Patent
Okamoto et al.

(10) Patent No.: US 7,936,733 B2
(45) Date of Patent: May 3, 2011

(54) RADIO COMMUNICATION APPARATUS

(75) Inventors: Shinya Okamoto, Fukuoka (JP);
Yoshinori Soejima, Fukuoka (JP);
Akihide Otonari, Fukuoka (JP);
Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 11/889,660

(22) Filed: Aug. 15, 2007

(65) Prior Publication Data

US 2008/0043651 A1    Feb. 21, 2008

(30) Foreign Application Priority Data

Aug. 21, 2006  (JP) ................................. 2006-224106

(51) Int. Cl.
*H04W 4/00* (2009.01)
(52) U.S. Cl. ........................ 370/338; 370/474
(58) Field of Classification Search ........................ None
See application file for complete search history.

(56) References Cited

U.S. PATENT DOCUMENTS

| | | | | |
|---|---|---|---|---|
| 6,956,855 | B1 * | 10/2005 | Chang | 370/394 |
| 7,154,873 | B2 * | 12/2006 | Yi | 370/338 |
| 7,359,403 | B1 * | 4/2008 | Rinne | 370/469 |
| 2006/0018318 | A1 | 1/2006 | Rinne et al. | |
| 2008/0043651 | A1 * | 2/2008 | Okamoto et al. | 370/310 |
| 2008/0219291 | A1 * | 9/2008 | Obuchi et al. | 370/469 |
| 2009/0044067 | A1 * | 2/2009 | Obuchi et al. | 714/748 |

FOREIGN PATENT DOCUMENTS

| | | |
|---|---|---|
| JP | 09-139727 | 5/1997 |
| JP | 2006-020044 | 1/2006 |
| WO | WO 2004/030266 A1 | 4/2004 |
| WO | 2006043746 A1 | 4/2006 |
| WO | WO 2006/101347 A1 | 9/2006 |

OTHER PUBLICATIONS

Extended European Search Report dated Dec. 12, 2007 issued in corresponding European Application No. 07114657.5-2413.
Office Action issued in corresponding European Patent Application No. 07114657.5-2413 dated Oct. 11, 2011.
Japanese Office Action dated Oct. 26, 2010 for application No. 2006-224106.
3GPP TSG RAN2 #52 R2-060858 Athens, Greece Mar. 27-31, 2006.

* cited by examiner

*Primary Examiner* — Robert W Wilson
(74) *Attorney, Agent, or Firm* — Murphy & King, PC

(57) ABSTRACT

On the transmission side, the RLC PDUs divided from the RLC SDU are transmitted after retransmission identification information is attached thereto. On the reception side, the retransmission identification information attached to each received RLC PDU is referred to, and only the RLC PDUs having an identical retransmission identification information to a set assumed value are stored in a buffer memory, and the RLC PDUs having the identical retransmission identification information are assembled into an RLC SDU.

2 Claims, 9 Drawing Sheets

FIG.11

Header Extension Type(HE)

| Value | Description |
|---|---|
| 00 | The succeeding octet contains data |
| 01 | The succeeding octet contains a length indicator and E bit |
| 10-11 | Reserved (PDUs with this coding will be discarded by this version of the protocol). |

RADIO COMMUNICATION APPARATUS

CROSS-REFERENCE TO RELATED APPLICATIONS

This application is based upon and claims the benefit of priority from the prior Japanese Patent Application No. 2006-224106, filed on Aug. 21, 2006, the entire contents of which are incorporated herein by reference.

BACKGROUND OF THE INVENTION

1. Field of the Invention

The present invention relates to a radio communication apparatus for receiving and transmitting variable-length RLC PDU data in an RLC layer belonging to Layer 2 forming a radio communication protocol layer, and more particularly a radio communication apparatus for correctly assembling an RLC SDU from the retransmitted RLC PDU data.

2. Description of the Related Art

A W-CDMA system becomes widely used today as a third generation (3G) radio communication system. Further, a standard called HSDPA (High-Speed Downlink Packet Access) comes into practical use to obtain high-speed (14 Mbps maximum) data communication in W-CDMA. HSDPA is also called as 3.5G system because of an improved version of the 3G system. The standardization is carried out by 3GPP (the 3rd Generation Partnership Project), an association for standardizing the 3G system.

HSDPA has the features of (1) shared use of one physical channel by a plurality of mobile terminals (UE) in time division, (2) automatic selection of higher speed modulation system and coding system depending on an electric wave condition, (3) adopting hybrid ARQ in which retransmission control (ARQ) is combined with correction coding processing, and so on.

FIG. 1 shows a diagram illustrating a data structure of Layer 2 in the protocol architecture corresponding to HSDPA. Layer 2 is divided into sublayers including MAC (Medium Access Control)-hs, MAC-d, and RLC (Radio Link Control).

FIG. 2 shows a diagram illustrating the format of RLC PDU (Protocol Data Unit). RLC PDU shown in FIG. 2 is an Acknowledge Mode RLC PDU (which is referred to as RLC AMD PDU in some cases, and the RLC PDU used in the following is RLC AMD PDU. AMD: Acknowledge Mode Data) enabling data delivery confirmation control and data retransmission control. RLC PDU includes D/C bit for distinguishing between a user data and a control data; sequence number (SN) indicating the sequential order of RLC-PDU; polling bit P indicating the presence/non-presence of a delivery confirmation request; area HE (Header Extension Type) indicating user data extension information; length indicator LI; E bit; data storage area Data; and padding bit PAD or piggyback (Piggybacked STATUS PDU).

The data size of RLC PDU is fixed to, for example, 42 octets, 82 octets or 122 octets (where 1 octet is 8 bits), which is not changed during communication. RLC PDU is identified by the sequence number SN, which has a numeric value ranging from, for example, 0 to 4,095 maximum.

In RLC shown in FIG. 1, on the transmission side of RLC, a transmission data RLC SDU (Service Data Unit) fed from an upper layer is divided into a plurality of RLC PDUs, and forwarded to the lower MAC-d layer, after a sequence number SN is given to identify each RLC PDU.

On the reception side of RLC, when the RLC PDUs are received from the lower MAC-d layer, by being sorted in order of the sequence number SN, the above RLC PDUs are combined to assemble an RLC SDU, and then transferred to the upper layer. At this time, when there is a missing sequence number SN, a retransmission request for an RLC PDU corresponding to the missing SN is initiated.

Therefore, the transmission side of RLC is required to retain the transmitted RLC PDU in a buffer (memory) until the notification of delivery confirmation is received from the reception side of RLC. Further, on the reception side of RLC, there is provided a buffer (memory) for storing RLC PDUs by the amount necessary to assemble an RLC SDU, and when the entire RLC PDUs necessary to assemble the RLC SDU are completed, the RLC SDU is assembled.

Further, on the transmission side of RLC, the delivery confirmation control is performed by setting to "1" the polling bit P included in the RLC PDU. On the reception side of RLC, when the RLC PDU having the polling bit P set to "1" is received, it is confirmed whether there is any omission in the sequence numbers SN of the RLC PDUs having been received so far, and if there is no omission, a response is given using STATUS PDU (ACK). If there is any omission, a response of the omission information is given using a STATUS PDU (NACK). On the transmission side, a timer is provided to avoid a multiplicity of occurrence of the STATUS PDU responses after the STATUS PDU response is given, and when the omission information is notified by NACK, the timer is started therefrom, and the subsequent STATUS PDU response is not generated before the timeout of the timer.

On the transmission side, the timer is started after requesting for delivery confirmation, and when the STATUS PDU response is not received before the timeout of the timer, it is decided to be caused by data loss in the radio bandwidth, and the RLC PDU having the polling bit P set to "1" is transmitted again. When the STATUS PDU (ACK) is received, it is recognized that the RLC PDUs so far are normally received, while when a retransmission request by the STATUS PDU (NACK) is received, the RLC PDU requested for retransmission is retransmitted.

In Japanese laid-open Patent Publication No. 2006-20044, there is disclosed a memory management method in the MAC-hs sublayer, enabling reduction of the increase of the memory amount without need of a complicated memory control method, by dividing a variable-length MAC-hs PDU into each unit of RLC PDU and storing into a shared memory (buffer) together with a sequence number.

After the realization of the above-mentioned 3.5G mobile communication systems by HSDPA, subsequently, migration to the fourth generation (4G) systems will be expected in early stages so as to realize higher speed and larger capacity. However, in the present estimation, one more stage called as "3.9G"(which may also be called as "Super 3G") will be introduced before migration to 4G systems. As the communication speed of the 3.9G systems, a maximum speed of 100 Mbps, or of that order, is assumed. At present, as the 3.9G specification, a study is in progress in 3GPP to modify RLC PDU of fixed length as shown in FIGS. 1 and 2 to have variable length.

FIG. 3 is a diagram illustrating an assumed configuration of the RLC sublayer when the RLC PDU is modified to have variable length. As shown in FIG. 3, when the RLC PDU is modified to have variable length, the sequence number SN is used as a number to identify an RLC SDU. To identify an RLC PDU constituting each RLC SDU, assumedly, an SI (Segment Indicator) will be introduced. In case of the fixed-length RLC PDU, the number of RLC PDUs constituting a fixed-length RLC SDU is uniquely determined. Accordingly, the RLC SDU can be identified when the RLC PDU is identified.

However, when the RLC PDU is modified to have variable length, the number of RLC PDUs constituting each RLC SDU is not uniquely determined, which necessitates introduction of any symbol to identify the RLC SDU further. Thus, the sequence number SN conventionally used to identify each RLC PDU is used as a symbol to identify RLC SDU, and the segment indicator SI is newly introduced as a symbol to identify the RLC PDU. LSI (Last Segment Indicator) is provided for indicating a last segment at the time of division.

FIG. 4 shows an exemplary format when the RLC PDU is modified to have variable length. As described above, when the RLC PDU is modified to have variable length, the sequence number SN becomes the number to identify the RLC SDU, and the RLC PDU is to be identified by the combination of the above sequence number SN and the segment indicator SI belonging thereto.

In the retransmission control when the RLC PDU is modified to have variable length, the following problem occurs. In order to make it possible to modify a data division size of the RLC PDU retransmission-by-retransmission affected by channel quality, etc., a case is assumed that the retransmission unit on the transmission side is modified from the basis of an RLC PDU unit to the basis of an RLC SDU unit. In such the case, on the reception side, at the time point when at least one omission is recognized among the plurality of RLC PDUs divided from a certain RLC SDU, a STATUS-PDU (NACK) response is made, thereby requesting the transmission side for retransmission, and the information of the received RLC PDUs of the RLC SDU having been recognized as omission is cleared, so as to prepare for the above RLC PDU of the RLC SDU to be retransmitted.

However, consider a case that the RLC SDU for retransmission is divided into a plurality of RLC PDUs, and the omission of a portion of the RLC PDUs is recognized before receiving the entire RLC PDUs corresponding to the RLC SDU concerned. Nevertheless, the RLC PDU having been recognized as omission may be received with delay, due to a reception delay, etc., after the response by the STATUS-PDU (NACK). In the above case, the RLC PDU of the RLC SDU newly requested for retransmission is also received thereafter.

In such the case, on the reception side, it is not possible to decide whether the received RLC PDU is the data transmitted first or the retransmitted data in response to the retransmission request. Since the reception side cannot distinguish either the new or old data, there is a case that the divided RLC PDUs are mixed combined by mistake.

FIG. 5 shows a diagram illustrating an example in which an RLC PDU transmitted first is mixed existent with a retransmitted RLC PDU. The variable-length RLC PDUs are transmitted in the format shown in FIG. 4, and the received RLC PDUs are successively stored in a buffer memory on the reception side.

At (1) shown in FIG. 5, the omission of a RLC PDU having SN=0, SI=1 occurs, and at (2), because of the P bit attached to the RLC PDU of SN=0, SI=3, it comes to the timing for generating a STATUS-PDU. Accordingly, a NACK with the omission information of SN=0 (there is an omission in the RLC PDUs having SN=0) attached thereto is transmitted to the transmission side. At this time, information of SN=0, SI=0, 2, 3 having been received is once cleared (deleted from the buffer), so as to prepare for accepting retransmission data. Thereafter, on the reception side, an RLC PDUs of SN=0, SI=4 and 5 are received and retained in the buffer. At this time, because LSI=1 is set in the RLC PDU of SN=0, SI=5, the reception side recognizes that the RLC SDU of SN=0 is divided into six RLC PDUs.

On the transmission side, the STATUS-PDU (NACK) is received at (3), and the retransmission of the RLC SDU having SN=0 is performed accordingly. At this time, on the transmission side, the retransmission is performed after modifying the number of divisions of the RLC SDU from 6 to 7. The number of divisions is varied in real time, depending on the condition and the quality of the channel.

On the reception side, at (4), when SN=0, SI=0, 1, 2 and 3 are received, it is decided that the PDUs divided into six (6) have entirely been received, thus the RLC PDUs are combined to generate an RLC SDU.

However, actually, the RLC SDU is generated by combining PDUs of SI=4 and 5 before the retransmission, being divided into six, with the RLC PDUs of SI=0, 1, 2 and 3 after the retransmission, being divided into seven. Accordingly, there arises a problem that the RLC SDU of SN=0 cannot be generated correctly. Moreover, the RLC PDUs retransmitted at (5), (6) and (7) are recognized as if the data of which reception is completed are received again, and therefore the above RLC PDUs are discarded. Thus, the RLC SDU cannot be assembled from the retransmitted RLC PDUs.

Further, at (8), before the transmission of the entire RLC PDUs of SN=0 is completed, a STATUS PDU (ACK) is received from the reception side, which brings recognition that the entire RLC PDUs divided from the RLC SDU of SN=0 have been received, thus producing a contradiction.

SUMMARY OF THE INVENTION

Accordingly, it is an object of the present invention to provide radio communication apparatus capable of correctly assembling an RLC SDU from received RLC PDUs even when a dividing manner of the RLC SDU is different at each transmission (retransmission) of the RLC PDU because the RLC PDU comes to have variable length.

As a first configuration of a radio communication apparatus according to the present invention to achieve the aforementioned object, in the radio communication apparatus for receiving variable-length RLC PDU data in an RLC layer belonging to Layer 2 forming a radio communication protocol layer, and assembling one RLC SDU data from one or a plurality of RLC PDU data, the radio communication apparatus includes a buffer memory, and a controller referring to retransmission identification information included in the header of the received RLC PDU data, storing into the buffer memory the RLC PDU data having the retransmission identification information identical to a preset assumed value, and assembling the RLC SDU data from the RLC PDU data having the identical retransmission identification information.

As a second configuration of the radio communication apparatus according to the present invention, in the above first configuration, the controller changes the assumed value whenever transmitting a retransmission request for the RLC PDU data corresponding to a predetermined RLC SDU data.

As a third configuration of the radio communication apparatus according to the present invention, in the above second configuration, the retransmission identification information is the number of times of retransmission, and the controller increments the assumed value by a predetermined unit value whenever transmitting the retransmission request for the RLC PDU data corresponding to the predetermined RLC SDU data.

As a fourth configuration of the radio communication apparatus according to the present invention, in the above second configuration, the retransmission identification information is binary information, and the controller alternately switches over the assumed value between the binary values whenever transmitting the retransmission request for the RLC PDU data corresponding to the predetermined RLC SDU data.

As a fifth configuration of the radio communication apparatus according to the present invention, in the above fourth configuration, the binary information is assigned to one bit in a data extension area, HE (Header Extension type) area, in the header of the RLC PDU data.

As a sixth configuration of the radio communication apparatus according to the present invention, in the radio communication apparatus for transmitting variable-length RLC PDU data in an RLC layer belonging to Layer 2 forming a radio communication protocol layer, the radio communication apparatus includes: a generation section generating one or a plurality of variable-length RLC PDU data by dividing one RLC SDU data; and a transmission controller transmitting the generated one or plurality of RLC PDU data by attaching first retransmission identification information, and on receipt of a retransmission request for the RLC PDU data having been transmitted, retransmitting the RLC PDU data by attaching second retransmission identification information different from the first retransmission identification information.

As a seventh configuration of the radio communication apparatus according to the present invention, in the above sixth configuration, the second retransmission identification information is a value obtained by adding a predetermined value to the first retransmission identification information.

As an eighth configuration of the radio communication apparatus according to the present invention, in the above sixth configuration, the first retransmission identification information and the second retransmission identification information are binary information, which are one and the other of the binary values, respectively.

As a ninth configuration of the radio communication apparatus according to the present invention, in the above eighth configuration, the binary information is assigned to one bit in a data extension area, HE (Header Extension type) area, in the header of the RLC PDU data.

According to the present invention, from retransmission identification information included in the RLC PDU header, it is possible to identify whether the received RLC PDUs are transmitted based on a predetermined retransmission request, and by combining the RLC PDUs having identical retransmission identification information, a correct RLC SDU can be generated.

BRIEF DESCRIPTION OF THE DRAWINGS

FIG. 11 shows a table illustrating the definition of the data extension area HE in the RLC PDU header.

DETAILED DESCRIPTION OF THE PREFERRED EMBODIMENTS

The preferred embodiments of the present invention are described hereinafter referring to the charts and drawings. However, the embodiments described below are not intended to limit the technical scope of the present invention.

Figure 1:
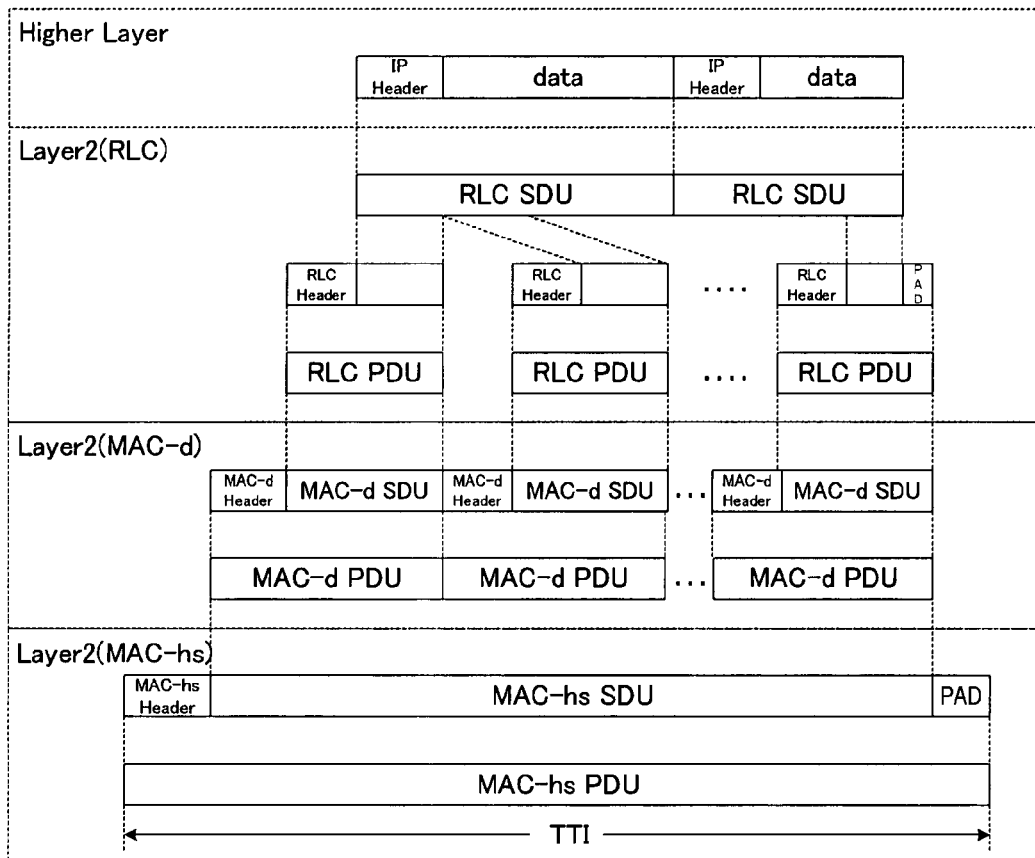
FIG. 1 shows a diagram illustrating a data structure of Layer 2 in the protocol architecture corresponding to HSDPA.
Figure 2:
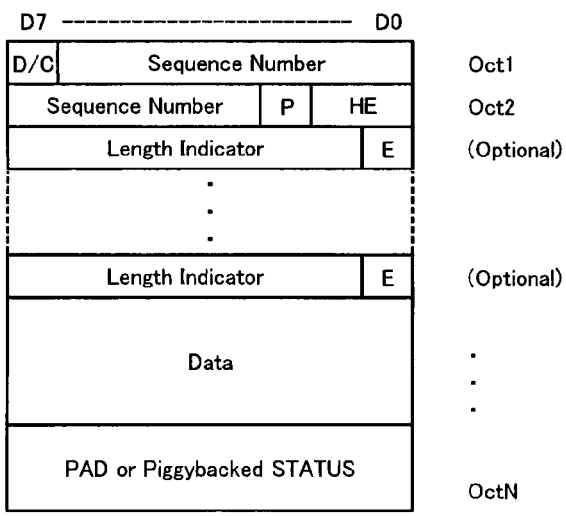
FIG. 2 shows a diagram illustrating an RLC PDU (Protocol Data Unit) format.
Figure 3:
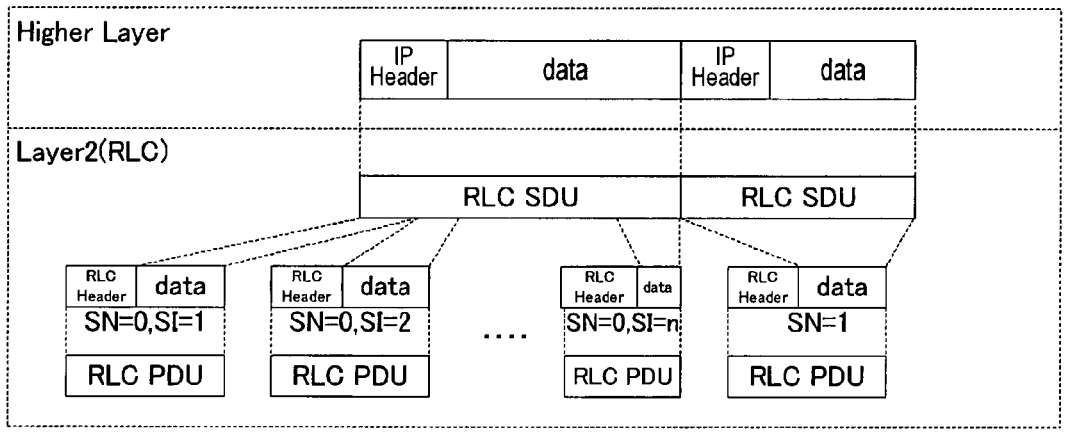
FIG. 3 shows a diagram illustrating an assumed configuration of the RLC sublayer when the RLC PDU is modified to have variable length.
Figure 4:
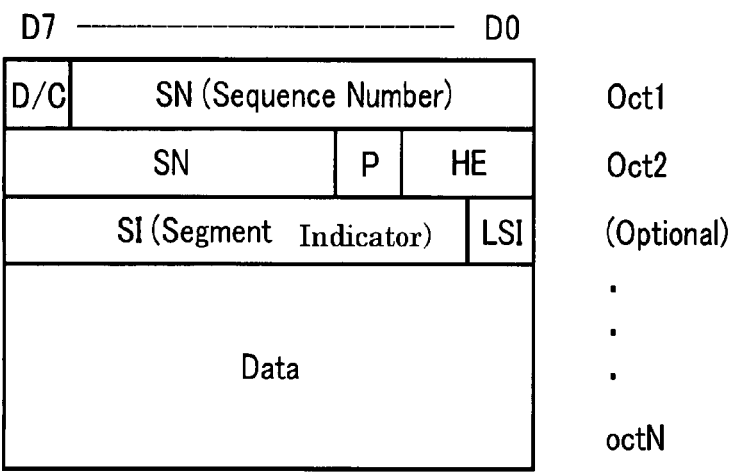
FIG. 4 shows an exemplary format when the RLC PDU is modified to have variable length.
Figure 5:
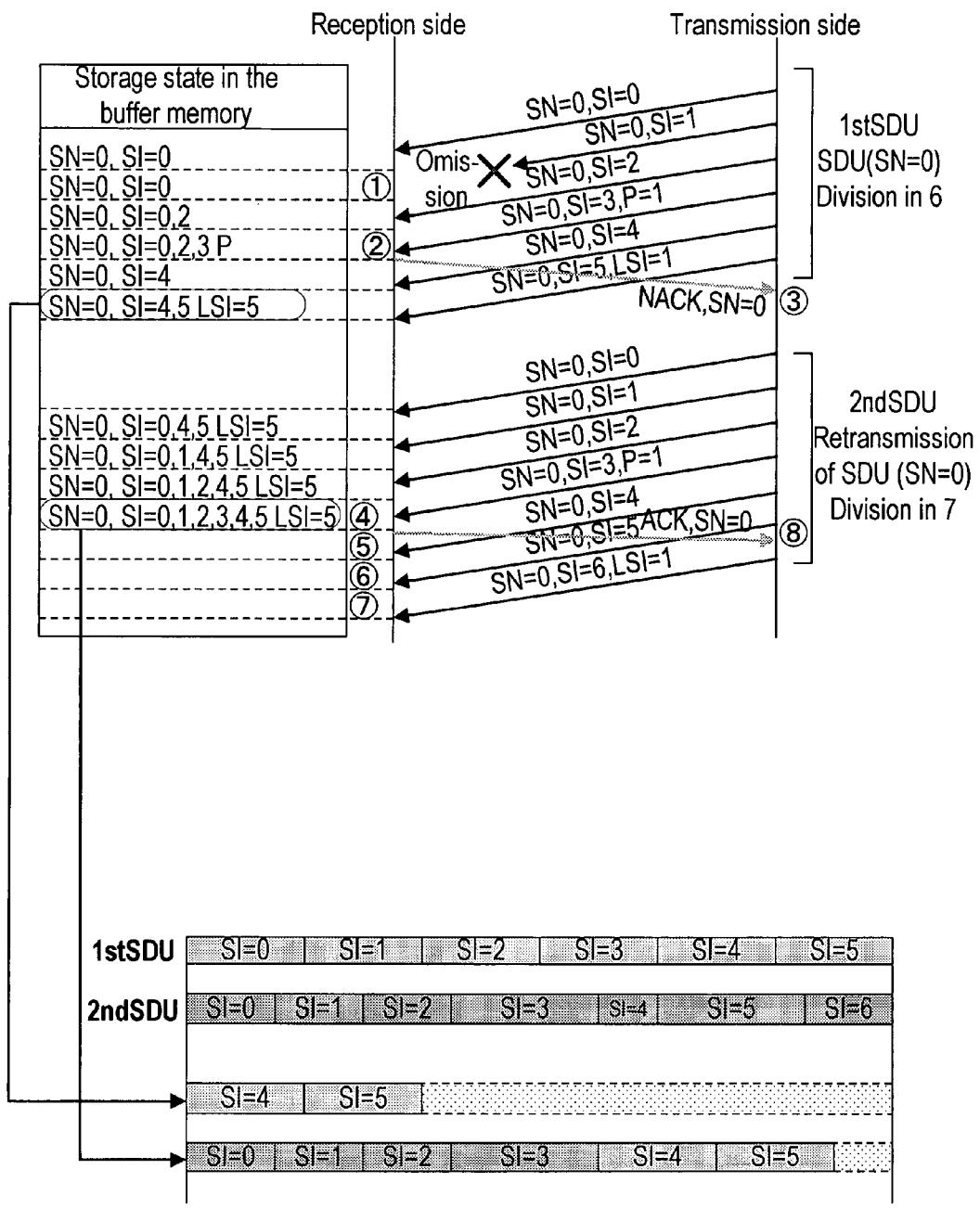
FIG. 5 shows a diagram illustrating an example in which an RLC PDU transmitted first is mixed existent with a retransmitted RLC PDU.
Figure 6:
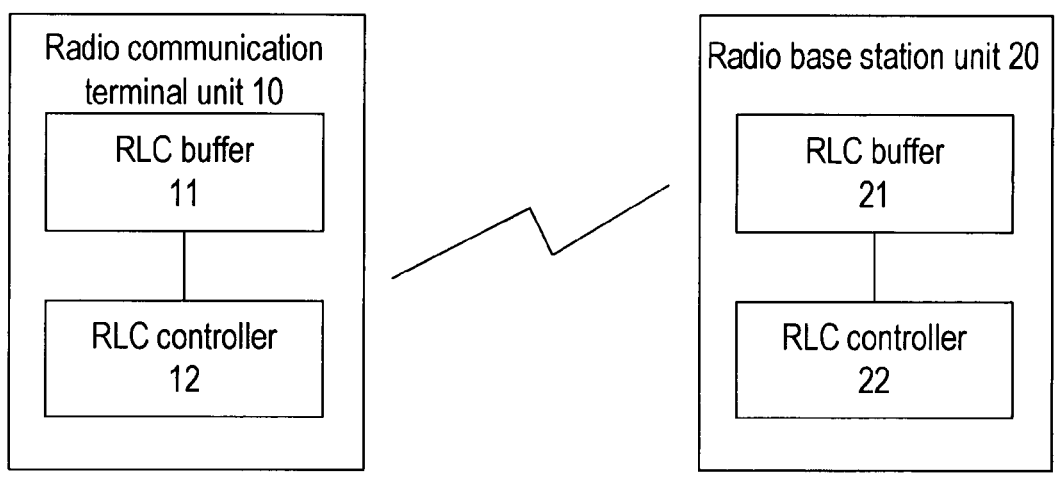
FIG. 6 shows a configuration diagram of a radio communication apparatus according to an embodiment of the present invention.

FIG. 6 shows a configuration diagram of a radio receiving apparatus according to an embodiment of the present invention. The radio receiving apparatus is a radio communication terminal unit 10 or a radio base station unit 20. Radio communication terminal unit 10 and radio base station unit 20 respectively includes RLC buffers 11, 21, and RLC controllers 12, 22 for performing readout control and write control thereto. The embodiment described in the following is the control on the transmission side and the reception side of RLC. In case of application to a downlink such as HSDPA, radio communication terminal unit 10 becomes the radio communication apparatus on the reception side, while radio base station unit 20 becomes the radio communication apparatus on the transmission side. In case of application to an uplink such as HSUPA, radio communication terminal unit becomes the radio communication apparatus on the transmission side, while radio base station unit 20 becomes the radio communication apparatus on the reception side. Hereafter, the description is given using an exemplary downlink case in which radio communication terminal unit 10 is the apparatus on the reception side and radio base station unit 20 is the apparatus on the transmission side. However, the embodiment of the present invention is applicable to an uplink case in a similar manner. RLC controllers 12, 22 may be formed of hardware, software or the combination thereof.

In case of the application to the transmission side, as will be described later, each RLC controller 12, 22 includes a function to generate one or a plurality of RLC PDUs by dividing an RLC SDU into the one or plurality of variable-length RLC PDUs, and a function to attach retransmission identification information to the header of the generated RLC PDU and transmit, based on a retransmission request for an RLC PDU initiated from the reception side.

Also, in case of the application to the reception side, as will be described later, each RLC controller 12, 22 includes functions of referring to the retransmission identification information attached to the received RLC PDU, storing only the RLC PDU having identical retransmission identification information to an assumed set value into buffer memory 11, 21, and assembling an RLC SDU from the RLC PDU having the identical retransmission identification information.

Figure 7:
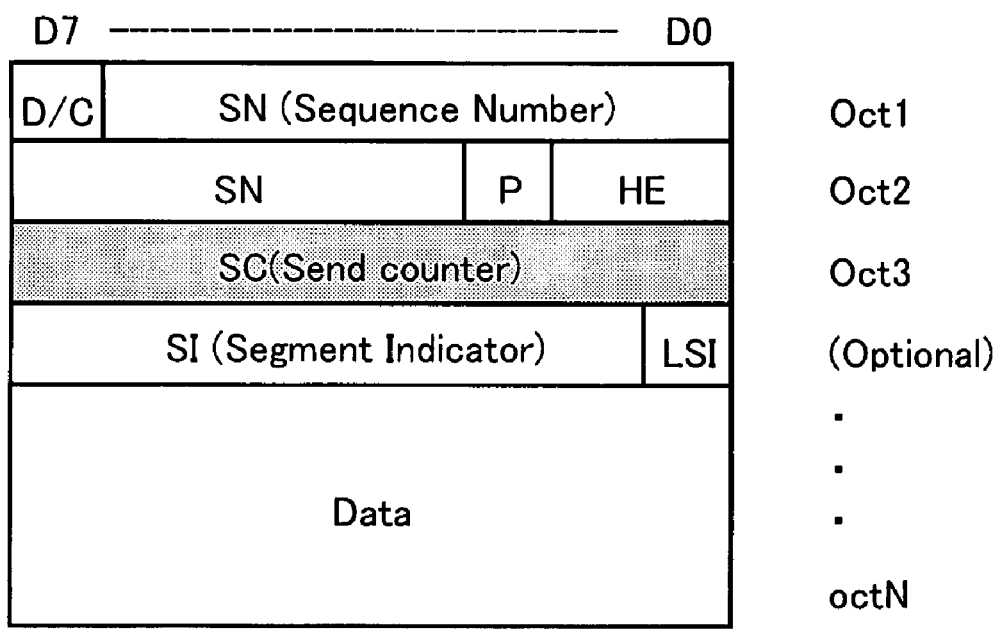
FIG. 7 shows a diagram illustrating a first exemplary format of an RLC PDU according to an embodiment of the present invention.

FIG. 7 shows a diagram illustrating a first exemplary format of the RLC PDU according to an embodiment of the present invention. In the header, the RLC PDU has a retransmission count SC (Send Counter) as the retransmission identification information, in addition to the sequence number SN, the segment indicator SI, etc. Before initiating the retransmission request, RLC controller 12 on the reception side recognizes the assumed value of the retransmission count SC to be "0", for an RLC PDU to be received, and whenever initiating the retransmission request [whenever transmitting a STATUS PDU (NACK)], increments the assumed value of the retransmission count SC which is to be included in the received RLC PDU.

The retransmission count SC is added at the transmission side (when RLC controller 12 is the reception side, the transmission side is RLC controller 22), which increments the retransmission count SC in the RLC PDU for retransmission and transmits, whenever transmitting the RLC PDU for the retransmission after receiving the STATUS PDU (NACK) from RLC controller 12 of the reception side.

RLC controller 12 on the reception side refers to the retransmission count SC in the received RLC PDU, decides whether the entire RLC PDUs having an identical retransmission count SC are received in regard to a certain sequence number SN, and combines the RLC PDUs having the identical retransmission count SC, so as to assemble the RLC SDU. Further details will be described below referring to FIG. 8.

Figure 8:
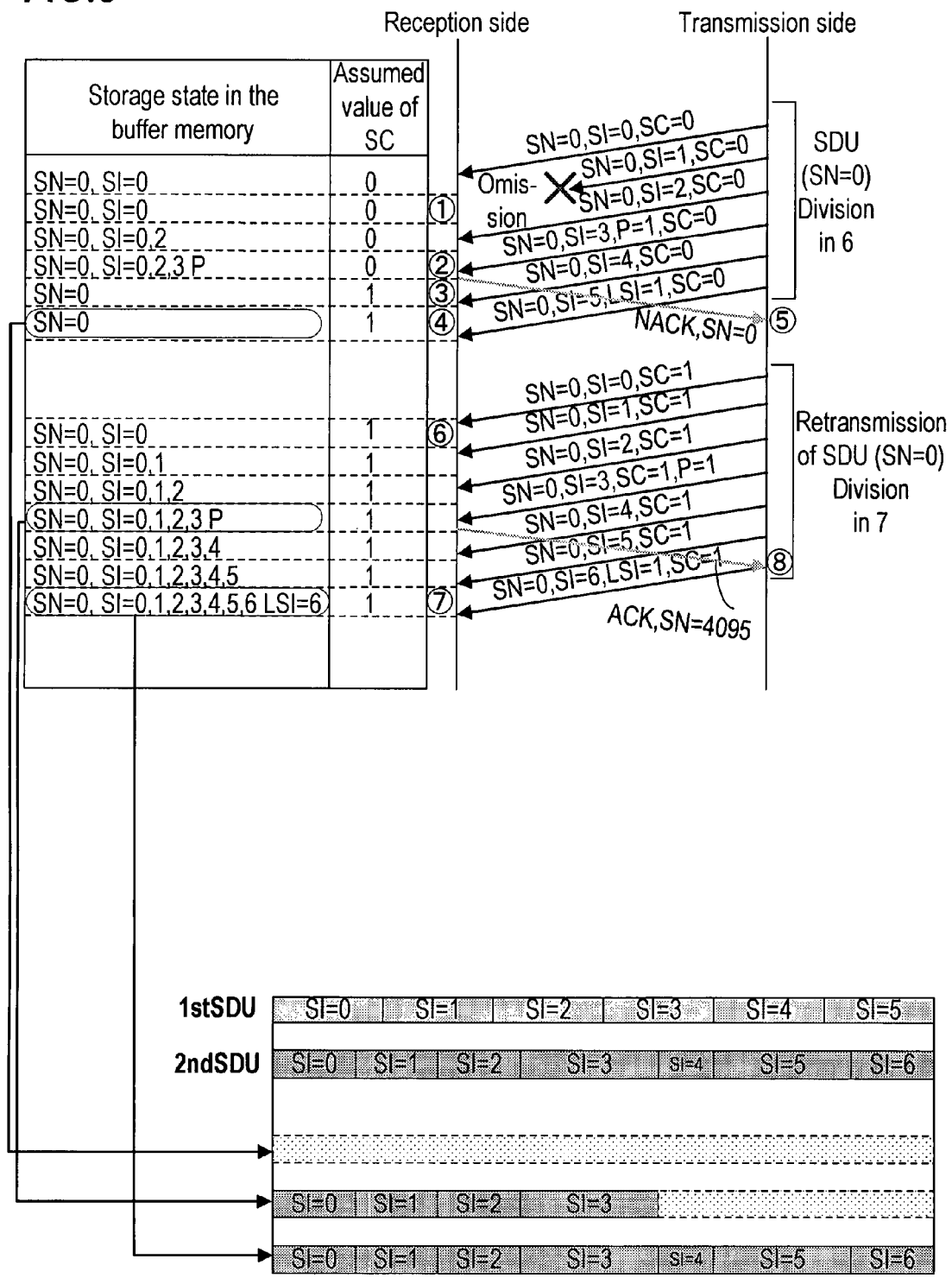
FIG. 8 shows a diagram explaining a first exemplary operation of RLC controller 12 according to an embodiment of the present invention.

FIG. 8 shows a diagram explaining a first exemplary operation of RLC controller 12 according to an embodiment of the present invention. At the beginning, an RLC SDU having a sequence number SN=0 is divided into six, and the six RLC PDUs having the sequence number SN=0, segment indicators SI=0-5 are transmitted from RLC controller 22 on the transmission side. At this time, the entire retransmission counts SC in the RLC PDUs for transmission are SC =0. RLC controller 12 on the reception side also assumes the reception of the RLC PDUs having retransmission count SC =0, because of the first transmission of the RLC PDU having the sequence number SN=0.

RLC controller 12 on the reception side successively receives the transmitted RLC PDUs, and stores into RLC buffer 11 after confirming the retransmission count SC =0. At (1) shown in FIG. 8, an omission of an RLC PDU of SN=0, SI=1 occurs, and at (2), from the P bit attached to the RLC PDU of SN=0, SI=3, it comes to STATUS PDU generation timing. Accordingly, a retransmission request is transmitted to the transmission side, as a STATUS-PDU (NACK), with omission information of SN=0 (there is an omission in the RLC PDUs having SN=0) attached thereto.

By transmitting the retransmission request, RLC controller 12 once clears (deletes from the buffer) the information SN=0, SI=0, 2, 3 already received, and prepares to accept the retransmission data. Also, RLC controller 12 increments by one the assumed value of the retransmission count SC, so as to produce SC=1, and wait for the reception of the RLC PDUs having the retransmission count SC=1.

Thereafter, at (3) and (4), RLC controller 12 receives RLC PDUs having SN=0, SI=4, 5. However, since each retransmission count of the above RLC PDUs is SC =0, which is different from the assumed retransmission count SC=1, RLC controller 12 discards the above received RLC PDUs, instead of storing into the RLC buffer 11.

At (5) in FIG. 8, on receiving the retransmission request STATUS PDU (NACK) from RLC controller 12 of the reception side, RLC controller 22 on the transmission side executes retransmission control. At this time, RLC controller 22 transmits the RLC PDUs after incrementing by one the each value of the retransmission count SC, thus resulting in SC=1, in the RLC PDUs for retransmission. As shown in the figure, the RLC SDU for transmission having a sequence number SN=0 is divided into seven, and the seven RLC PDUs having a sequence number SN=0, segment indicators SI=0-6 are transmitted from RLC controller 22 of the transmission side.

At (6) in FIG. 8, RLC controller 12 on the reception side successively receives the retransmitted RLC PDUs, and stores into RLC buffer 11 after confirming that each retransmission count SC equals the assumed retransmission count SC=1. In the retransmission, RLC controller 12 receives the RLC PDUs in order of the segment indicator SI, and at (7) in FIG. 8, receives an RLC PDU (SN=0, SI=6) having an LSI=1 indicative of the last segment indicator SI. On completion of the entire RLC PDUs having the sequence number SN=0, RLC controller 12 combines the RLC PDUs of the sequence number SN=0, to generate an RLC SDU having the sequence number SN=0.

Additionally, even at the time of retransmission, RLC controller 12 on the reception side transmits a STATUS-PDU which is caused by the P bit attached to the RLC PDU of SN=0, SI=3. At this time point, because there is no omission of the RLC PDU, RLC controller 12 transmits a STATUS PDU (ACK), with the recognition that the entire RLC PDUs up to SN=4,095 before SN=0 have been received. RLC controller 22 on the transmission side receives the above STATUS PDU (ACK), and accordingly, does not perform retransmission control again.

When an omission is produced even at the retransmission time, and when the retransmission control is performed again, the retransmission count SC is further incremented by one, thus becoming SC=2, and at the time point the entire RLC PDUs having SC=2 have been received, the RLC SDU is assembled therefrom. As such, using a retransmission count SC included in each RLC PDU, the RLC controller on the reception side identifies the retransmitted RLC PDUs, and combines the RLC PDUs having an identical retransmission count SC, to generate an RLC SDU.

When the RLC PDU comes to have variable length, producing a different dividing manner of the RLC SDU for each RLC PDU retransmission, the correct RLC SDU cannot be assembled if the RLC PDUs before and after the retransmission are mixed. In contrast, according to the operation in the present embodiment, by use of the retransmission count SC included in each received RLC PDU, it becomes possible to identify if the received RLC PDU is a retransmitted data, and the number of times of retransmission as well. Thus, it becomes possible to combine the RLC PDUs having an identical retransmission count SC, to generate the RLC SDU correctly.

Figure 9:
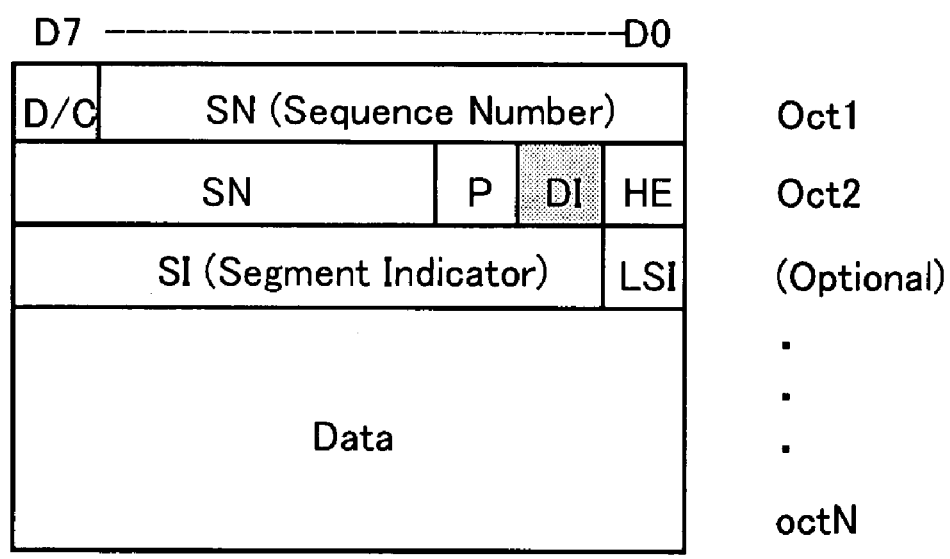
FIG. 9 shows a diagram illustrating a second exemplary format of an RLC PDU according to an embodiment of the present invention.

FIG. 9 shows a diagram illustrating a second exemplary format of an RLC PDU according to an embodiment of the present invention. In the header of the RLC PDU, in addition to the sequence number SN, the segment indicator SI, etc., there is provided a DI (Data Index) bit (binary information) as retransmission identification information, which is switched to 1 or 0 each time the retransmission is performed. Prior to requesting for retransmission, RLC controller 12 on the reception side recognizes an assumed value of the retransmission count SC in the received RLC PDU to be, for example, "0 (default value)". Whenever initiating the retransmission request [that is, whenever transmitting a STATUS PDU (NACK)], RLC controller 12 switches the assumed value of the DI bit included in the received RLC PDU to 1/0. Namely, in regard to the retransmission of an identical sequence number SN, the DI bit is "1" in the retransmission for the first time, while the DI bit is "0" in the retransmission for the second time.

For the DI bit, for example, there is used an upper bit in the two-bit area which is assigned beforehand as a data extension area HE (Header Extension Type) indicative of the user data extension information. FIG. 11 shows values of the data extension area HE defined by 3GPP. Since the upper bit is "reserved" and not used at present, by assigning the above bit as a bit for identifying retransmission, the DI bit can be added without extending the data length in the header.

The DI bit is added at the transmission side (when the RLC controller 12 is the reception side, the transmission side is RLC controller 22), which switches the value of the DI bit and transmits, whenever transmitting the RLC PDU for the retransmission after receiving the STATUS PDU (NACK) from RLC controller 12 of the reception side.

RLC controller 12 on the reception side refers to the DI bit in the received RLC PDU, decides whether the entire RLC PDUs having an identical DI bit value are received, combines the RLC PDUs having the identical DI bit, so as to assemble an RLC SDU. Further details will be described below referring to FIG. 10.

Figure 10:
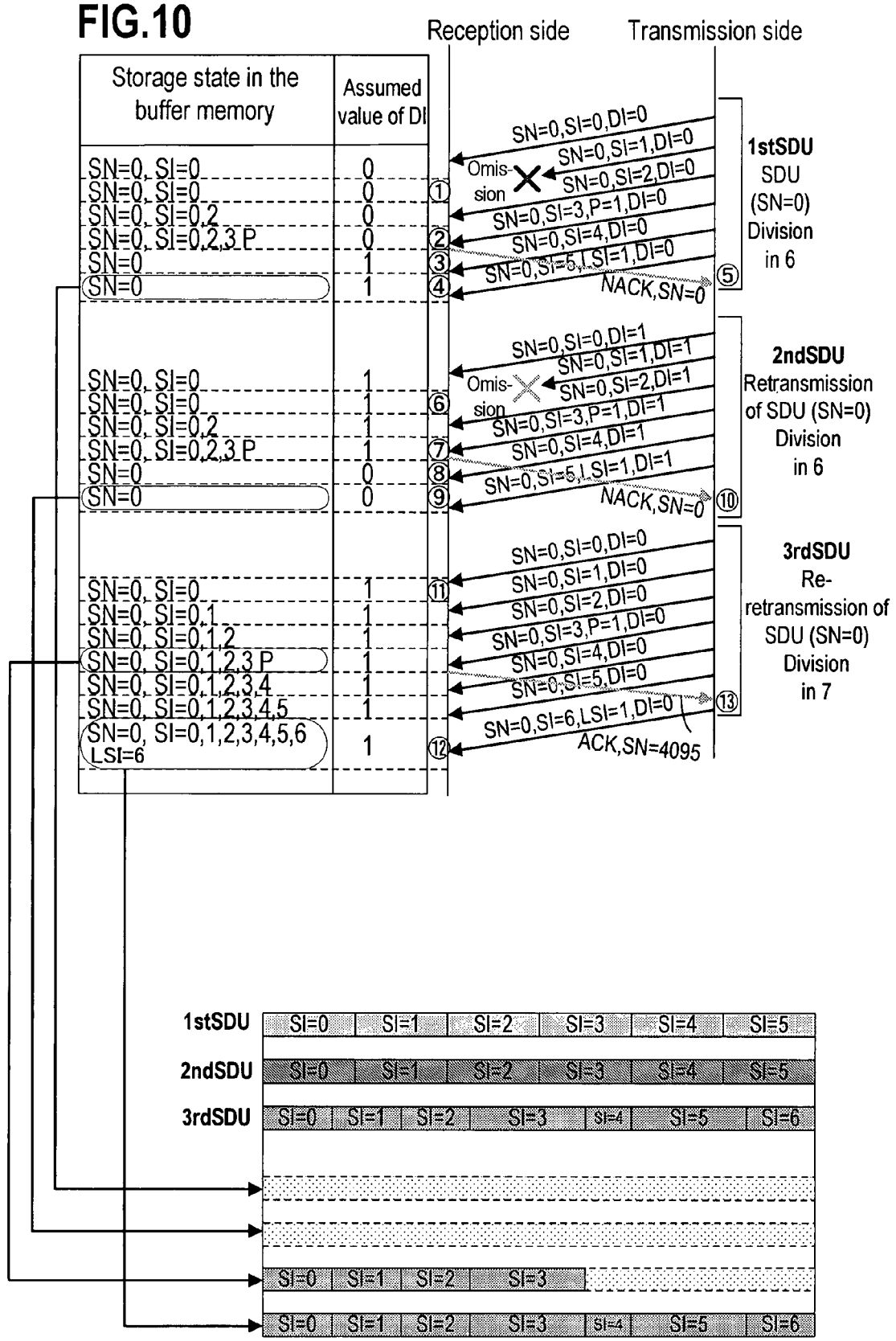
FIG. 10 shows a diagram explaining a second exemplary operation of RLC controller 12 according to an embodiment of the present invention.

FIG. 10 shows a diagram explaining a second exemplary operation of RLC controller 12 according to an embodiment of the present invention. Similar to FIG. 8, an RLC SDU having a sequence number SN=0 is divided into six at the beginning, and the six RLC PDUs having sequence number SN=0, segment indicators SI=0-5 are transmitted from RLC controller 22 on the transmission side. At this time, the entire DI bits in the RLC PDUs for transmission are DI=0. RLC controller 12 on the reception side also assumes the reception of the RLC PDUs having DI=0, because of the first transmission of the RLC PDU having the sequence number SN=0.

RLC controller 12 on the reception side successively receives the transmitted RLC PDUs, and stores into RLC buffer 11 after confirming DI=0. At (1) in FIG. 10, an omission of an RLC PDU of SN=0, SI=1 occurs, and at (2), from the P bit attached to the RLC PDU of SN=0, SI=3, it comes to STATUS-PDU generation timing. Accordingly, a retransmission request is transmitted to the transmission side, as a STATUS-PDU (NACK), with omission information of SN=0 (there is an omission in the RLC PDUs having SN=0) attached thereto.

By transmitting the retransmission request, RLC controller 12 once clears (deletes from the buffer) the information SN=0, SI=0, 2, 3 already received, so as to prepare for accepting retransmission data. RLC controller 12 then switches the assumed value of the DI bit, so as to make DI=1, and wait for the reception of the RLC PDU having DI=1.

Thereafter, at (3) and (4), RLC controller 12 receives RLC PDUs having SN=0, SI=4, 5. However, since each DI bit of the above RLC PDUs is DI=0, which is different from the assumed DI bit DI=1, RLC controller 12 discards the above received RLC PDUs.

At (5) in FIG. 10, on receiving the retransmission request STATUS PDU (NACK) from RLC controller 12 of the reception side, RLC controller 22 on the transmission side executes retransmission control. At this time, RLC controller 22 transmits the RLC PDU after switching the value of the DI bit, to DI=1, in the RLC PDU for retransmission. As shown in the figure, the RLC SDU for the first time retransmission having a sequence number SN=0 is divided into six, similarly to the original transmission, and the six RLC PDUs having the sequence number SN=0, segment indicators SI=0-5 are transmitted from RLC controller 22 of the transmission side.

RLC controller 12 on the reception side successively receives the retransmitted RLC PDUs. At (6) in FIG. 10, an omission of the RLC PDU of SN=0, SI=1 occurs again, and at (7), from the P bit attached to the RLC PDU of SN=0, SI=3, it comes to STATUS-PDU generation timing. Accordingly, a retransmission request is transmitted again to the transmission side, as a STATUS-PDU (NACK), with omission information of SN=0 (there is an omission of RLC PDU having SN=0) attached thereto.

Similar to the case of original transmission of the RLC PDU, by transmitting the retransmission request, RLC controller 12 once clears (deletes from the buffer) the information SN=0, SI=0, 2, 3 already received, and prepares to accept the retransmission data. Also, RLC controller 12 again switches the assumed value of the DI bit, to DI=0, and wait for the reception of the RLC PDUs having DI=0. At this time, it is assumed that a maximum lapse of time possible for reception, even considering a reception delay of the RLC PDU having DI=0 for the original transmission of the RLC PDU, has elapsed.

Thereafter, at (8) and (9), RLC controller 12 receives RLC PDUs having SN=0, SI=4, 5, but because each DI bit thereof is DI=1, which is different from the assumed DI bit DI=0, the received RLC PDUs are discarded, similarly to the case of the original transmission.

At (10) in FIG. 10, on receiving a retransmission request, STATUS PDU (NACK), again from RLC controller 12 of the reception side, RLC controller 22 on the transmission side executes retransmission control for the second time. At this time, the RLC PDU is transmitted after the value of the RLC PDU for retransmission is again switched to DI=0. As shown in the figure, the RLC SDU for the second time retransmission having the sequence number SN=0 is divided into seven, differently from the original transmission and the first time retransmission. Thus, seven RLC PDUs having the sequence number SN=0, segment indicators SI=0-6 are transmitted from RLC controller 22 of the transmission side.

At (11) in FIG. 10, RLC controller 12 again receives the retransmitted RLC PDUs of DI=0, and stores into RLC buffer 11 after confirming DI=0. In the second time retransmission, RLC controller 12 receives the RLC PDUs in order of the segment indicator SI, and at (12) in FIG. 10, receives an RLC PDU (SN=0, SI=6) having an LSI=1 indicative of the last segment indicator SI. On completion of the entire RLC PDUs having the sequence number SN=0, RLC controller 12 combines the RLC PDUs of the sequence number SN=0, to generate an RLC SDU having the sequence number SN=0.

Additionally, at the time of retransmission for the second time also, RLC controller 12 of the reception side transmits a STATUS-PDU which is caused by the P bit attached to the RLC PDU having SN=0, SI=3. At the above time point, because there is no omitted RLC PDU, RLC controller 12 transmits a STATUS PDU (ACK), with the recognition that the entire RLC PDUs have been received. RLC controller 22 on the transmission side receives the above STATUS-PDU (ACK), and accordingly, retransmission control is not performed again.

As such, without being limited to the retransmission count SC of which value is incremented at each retransmission time, by use of the DI bit (binary information) of which value is switched to 1 or 0 at each retransmission time, the retransmission of the RLC PDUs can be identified. By combining the RLC PDUs having an identical DI bit, an RLC SDU can be generated correctly.

The foregoing description of the embodiments is not intended to limit the invention to the one details of the examples illustrated. Any suitable modification and equivalents may be resorted to the scope of the invention. All features and advantages of the invention which fall within the scope of the invention are covered by the appended claims.

What is claimed is:

1. A Radio communication apparatus for receiving variable-length RLC PDU data in an RLC layer belonging to Layer 2 forming a radio communication protocol layer, and for reassembling one RLC SDU data from one or a plurality of variable-length RLC PDU data, the radio communication apparatus comprising:

- a buffer memory; and
- a controller referring to retransmission identification information included in a header of the received variable-length RLC PDU data, storing into the buffer memory the variable-length RLC PDU data having the retransmission identification information identical to a preset assumed value, reassembling the RLC SDU data from the variable-length RLC PDU data when the retransmission identification information is identical to the preset assumed value, and changing the preset assumed value whenever transmitting a retransmission request for the variable-length RLC PDU data corresponding to a predetermined RLC SDU data;

wherein the retransmission identification information is the number of times of retransmission, and the controller increments the preset assumed value by a predetermined unit value whenever transmitting the retransmission request for the variable-length RLC PDU data corresponding to the predetermined RLC SDU data.

2. A Radio communication apparatus for transmitting variable-length RLC PDU data in an RLC layer belonging to Layer 2 forming a radio communication protocol layer, the radio communication apparatus comprising:

- a generation section for dividing one RLC SDU data to generate one or a plurality of variable-length RLC PDU data having a first retransmission identification information; and
- a transmission controller, upon receipt of a retransmission request for the variable-length RLC PDU data attaching a second retransmission identification information in place of said first retransmission identification information, wherein the second retransmission identification information is different from the first retransmission identification information and is a value obtained by adding a predetermined value to the first retransmission identification information, and transmitting the variable-length RLC PDU data having the second retransmission identification information.

* * * * *